US007821160B1

(12) United States Patent
Roosli et al.

(10) Patent No.: US 7,821,160 B1
(45) Date of Patent: Oct. 26, 2010

(54) MODULAR WALL BOX SYSTEM

(75) Inventors: Philipp Roosli, Niantic, CT (US); Ryan Gardner, Niantic, CT (US); Rick Quirino, East Lyme, CT (US)

(73) Assignee: Inncom International Inc., Niantic, CT (US)

( * ) Notice: Subject to any disclaimer, the term of this patent is extended or adjusted under 35 U.S.C. 154(b) by 0 days.

(21) Appl. No.: 12/652,429

(22) Filed: Jan. 5, 2010

(51) Int. Cl.
*B23K 11/24* (2006.01)
*H04Q 5/22* (2006.01)
*H05B 37/02* (2006.01)

(52) U.S. Cl. ....................... 307/112; 315/292; 340/10.1

(58) Field of Classification Search ................. 307/112; 315/292; 340/10.1
See application file for complete search history.

(56) References Cited

U.S. PATENT DOCUMENTS

| | | | | |
|---|---|---|---|---|
| 3,385,944 | A | 5/1968 | Mackiewicz et al. | |
| 4,783,581 | A | 11/1988 | Flowers et al. | |
| 4,924,349 | A | 5/1990 | Buehler et al. | |
| 5,030,893 | A | 7/1991 | Spira et al. | |
| 5,153,816 | A | 10/1992 | Griffin | |
| 5,153,819 | A | 10/1992 | Hebel | |
| 5,180,886 | A | 1/1993 | Dierenbach et al. | |
| 5,290,983 | A | 3/1994 | Roberts et al. | |
| 5,463,286 | A | 10/1995 | D'Aleo et al. | |
| 5,738,496 | A | 4/1998 | Mehta | |
| 5,798,581 | A | 8/1998 | Keagy et al. | |
| 5,814,950 | A | 9/1998 | Carson et al. | |
| 5,821,704 | A | 10/1998 | Carson et al. | |
| 5,905,442 | A | 5/1999 | Mosebrook et al. | |
| 5,987,205 | A | 11/1999 | Moseley et al. | |
| 6,005,308 | A | 12/1999 | Bryde et al. | |
| 6,321,877 | B2 | 11/2001 | Yamakawa | |
| 6,400,103 | B1 * | 6/2002 | Adamson | 315/292 |
| 6,774,328 | B2 | 8/2004 | Adams et al. | |
| 7,099,723 | B2 | 8/2006 | Gonzales et al. | |
| 7,178,941 | B2 | 2/2007 | Roberge et al. | |
| 7,273,983 | B1 | 9/2007 | Rintz | |
| 7,362,385 | B2 | 4/2008 | Ohta et al. | |
| 7,416,310 | B1 | 8/2008 | Savicki, Jr. | |
| 7,499,261 | B2 | 3/2009 | Hash | |
| 7,576,285 | B1 | 8/2009 | Savicki, Jr. | |
| 7,652,395 | B2 * | 1/2010 | Von Arx et al. | 307/112 |
| 7,701,359 | B2 * | 4/2010 | Hatemata | 340/825.72 |

(Continued)

FOREIGN PATENT DOCUMENTS

| | | | |
|---|---|---|---|
| WO | 92/05615 | A1 | 4/1992 |

(Continued)

*Primary Examiner*—Michael Rutland Wallis
(74) *Attorney, Agent, or Firm*—Cantor Colburn LLP

(57) ABSTRACT

A device is provided and includes an actuator, mounted to a wall box, including a power supply, an electrical load controller and a terminal coupled to the power supply and the controller, an actuator interface disposed on the actuator to receive first commands relating to basic electrical load control by the controller and a separate interface, including a header to communicate with the terminal whereby the separate interface receives power and communicates with the controller, the separate interface being supportable at the wall box and, when the header and terminal communicate, configured to identify a type of the actuator and to receive second commands of a type unique to the identified actuator type and relating to the basic and enhanced electrical load control by the controller.

3 Claims, 6 Drawing Sheets

U.S. PATENT DOCUMENTS

| | | | |
|---|---|---|---|
| 2006/0050464 | A1 | 3/2006 | Von Arx et al. |
| 2006/0052905 | A1 | 3/2006 | Pfingsten et al. |
| 2006/0133079 | A1 | 6/2006 | Callahan |
| 2007/0235440 | A1 | 10/2007 | Gu et al. |
| 2007/0291010 | A1 | 12/2007 | Altonen et al. |
| 2008/0165538 | A1 | 7/2008 | Callahan |
| 2008/0224542 | A1 | 9/2008 | Freeman et al. |

FOREIGN PATENT DOCUMENTS

| | | | |
|---|---|---|---|
| WO | 02/067070 | A1 | 8/2002 |
| WO | 2004/023624 | A1 | 3/2004 |
| WO | 2006/017613 | A1 | 2/2006 |
| WO | 2006/029312 | A1 | 3/2006 |
| WO | 2008/113052 | A1 | 9/2008 |

* cited by examiner

MODULAR WALL BOX SYSTEM

BACKGROUND

Aspects of the present invention are directed to a modular wall box system.

A conventional wall box device that controls power delivered to a load and is fed with line voltage generally integrates load actuation and user interface functionality into a single device. Such devices include, for example, light dimmers for interior spaces. These light dimmers often feature replaceable front plates that are attached through a simple snap mechanism to the dimmer device. In some cases, multiple dimmers can be ganged together and finished by application of a cover plate made for the multi-gang box. Ganging of devices makes it possible to install triac-based dimmers, FET-based dimmers, relays and timers side-by-side.

It has been shown, however, that ganging devices of multiple vendors, or even the ganging of different product series by the same vendor, can often create slight esthetic problems due to the different materials, dimensions and color variations each product line features. In order to provide for more stringent esthetics, manufactures often feature devices that differ from the typical device dimensions to avoid the problem of mismatching.

To cater to the different tastes and requirements of the public, suppliers of wall box devices also offer different user interfaces, such as dimmers combined with a toggle switch, dimmers combined with a paddle switch, dimmers combined with a push-button switch, dimmers combined with a touch screen and so on. These user interfaces need to be produced in various device types, such as a 2-way dimmer, a 3-way dimmer, a FL-light dimmer, a remote controllable dimmer and so on. Unfortunately, in current devices, should a customer desire to change the user interface, say from a toggle switch to a paddle switch, the entire device has to be dismounted. This is wasteful as a perfectly good working dimming actuator has to be removed and often discarded for the sole purpose of upgrading the user experience. Further, if this operation is performed in commercial applications, in many instances the changing of a light dimmer needs to be executed by a licensed electrician with costs associated that often exceed the cost of the dimmer itself. Another problem arises when user interfaces become significantly costlier in relation to the load actuating parts. For example, the cost of a user interface that is based on an LCD and a touch screen, or the cost of a user interface with customized artwork often exceeds the cost of the dimming actuator. Should this actuator part fail, due to an overload situation during installation, a load failure such as a burned-out light bulb or the impact of a near-by lighting strike, the entire device would have to be removed and replaced in an unnecessarily wasteful and costly procedure.

A user interface being an integral part of a load controlling device is a further burden on the manufacturer. Customers often demand that devices installed comply with local and national building codes, such as the National Electric Code (NEC) and a common request is that devices are certified by Underwriter's Laboratories (UL) and or the Electrical Testing Laboratory (ETL). When a supplier of load controlling devices introduces a new series of products, they have to go through the entire certification process, even if, in essence, the load bearing and safety related aspects stay the same and just a new housing or user interface concept is applied. This slows down the development process and increases the cost of the product development.

For the stated reasons, it is desirable to methodically decouple the load actuating device part from the user interface so that they can be treated as two separate devices from a design, systems integration, installation and maintenance view point.

SUMMARY

In accordance with an aspect of the invention, a device is provided and includes an actuator, mounted to a wall box, including a power supply, an electrical load controller and a terminal coupled to the power supply and the controller, an actuator interface disposed on the actuator to receive first commands relating to basic electrical load control by the controller and a separate interface, including a header to communicate with the terminal whereby the separate interface receives power and communicates with the controller, the separate interface being supportable at the wall box and, when the header and terminal communicate, configured to identify a type of the actuator and to receive second commands of a type unique to the identified actuator type and relating to the basic and enhanced electrical load control by the controller.

BRIEF DESCRIPTIONS OF THE SEVERAL VIEWS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION

In accordance with aspects of the invention, a load bearing wall box device is provided with a relatively simple user interface for ON/OFF control that can be installed and operated independently from a final user interface. The final user interface may be compatible with other load bearing devices that receive power for their operation from the load bearing wall box device and may control the latter with enhanced capabilities, such as dimming or timing. A modular actuator and user interface method are provided that allow for the combination of various user interface types with various actuator types.

Other aspects of the invention provide for the ganging of load bearing devices in wall boxes for both new and retrofit installations and a user interface. The user interface offers shared resources such as microprocessor resources and communication transponders for multiple load bearing actuator devices and is capable of identifying the type of the connected wall box load actuating device. The user interface may also operate the actuator based on a programmed rule set that includes the possibility to reject operation if the load or actuator does not conform to a preset rule.

The load actuating wall box device can be certified by UL and ETL without a final user interface having been installed, with the final user interface being a class-2, low voltage, device that does not require UL or ETL approval. The load actuating wall box device can be installed without the final user interface in place and then operated in a construction mode until the final user interface arrives at the project site just before arrival of the tenants.

Accordingly, a modular wall box system includes a series of load bearing control devices with their own simple user interface. These load bearing devices can be triac-based dimmers, FET-based dimmers or relay controllers. These load bearing devices provide power to a user interface and provide the necessary means to be controlled by the user interface. The power connection and communication components between the load bearing device and the user interface are standardized so that every load bearing device can be operated from any compatible user interface device. The load bearing actuator devices provide for identification by the user interface so that the user interface can adapt its functionality to the corresponding capabilities and loads. In accordance with the aspects of the present invention, the resources of the user interface, such as the microprocessor, the touch screen, the backlighting infrastructure and the communication unit can be shared across multiple load bearing actuator devices for improved economy.

Figure 1:
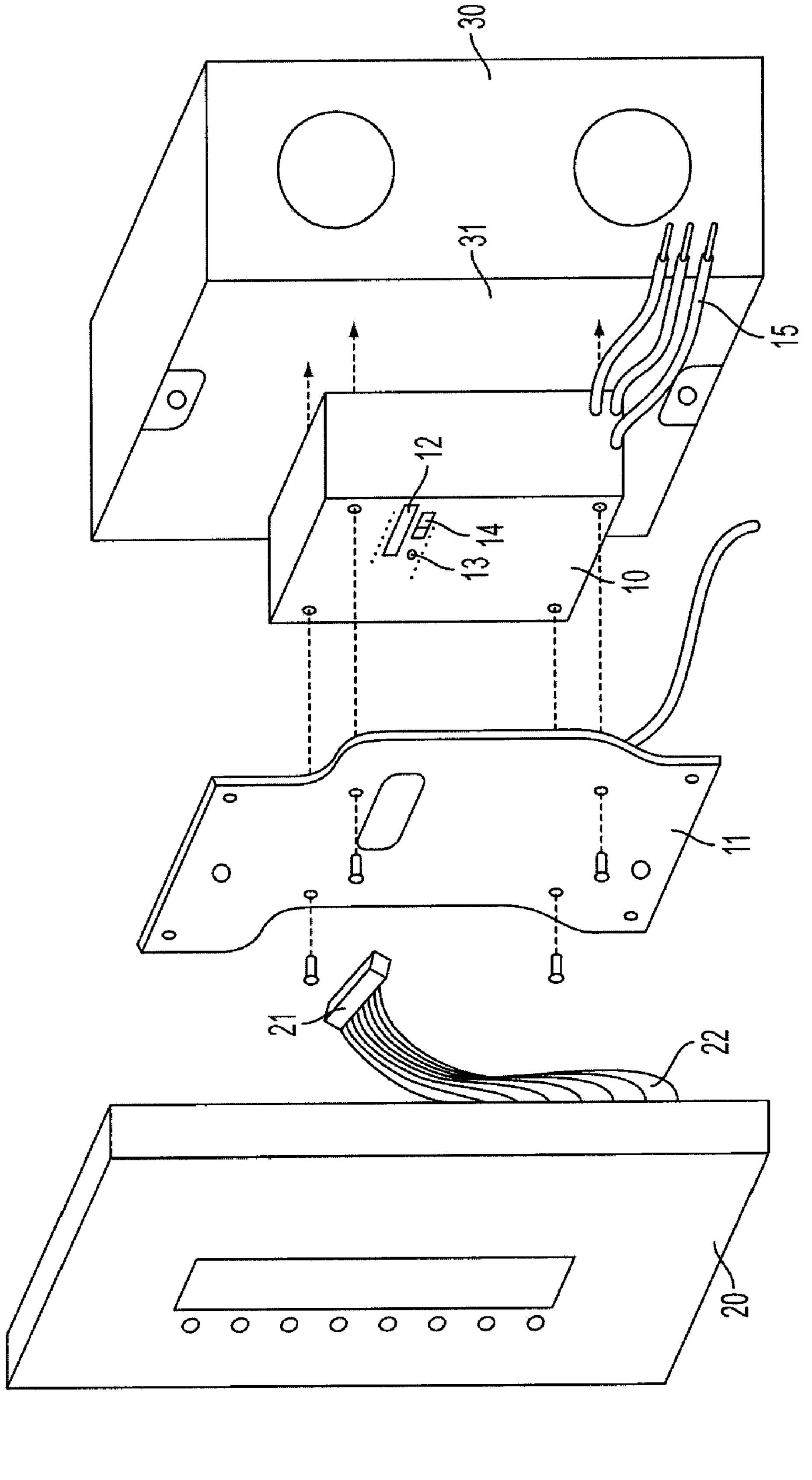
FIG. 1 is a view of a modular wall box system assembly.
Figure 2:
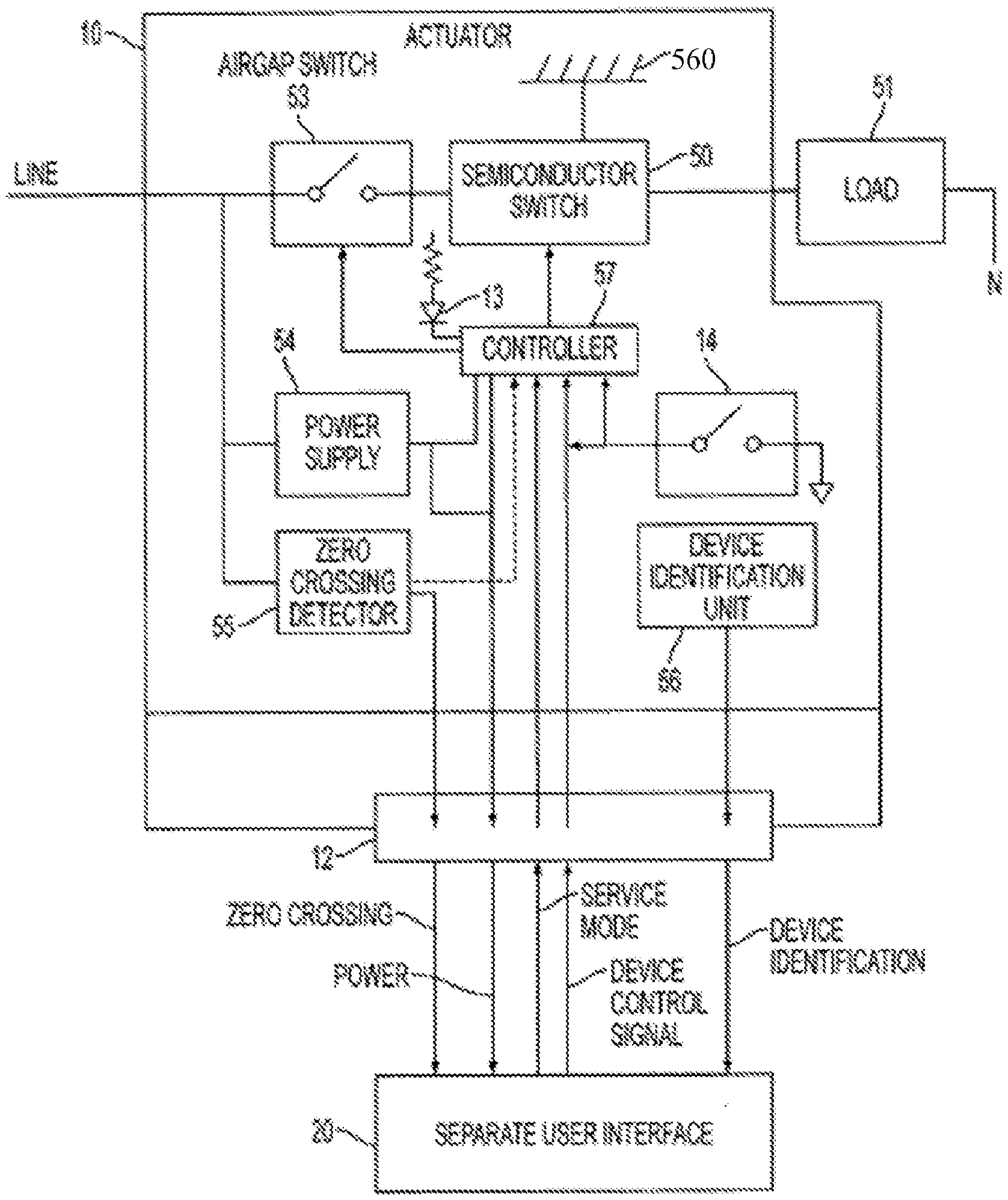
FIG. 2 is a block diagram of a load bearing actuator device.

Referring now to FIGS. 1 and 2, a modular wall box system in accordance with aspects of the invention includes a load bearing actuator 10, a yoke 11 and a separate user interface 20. The load bearing actuator 10 is supportably mounted proximate to a user accessible portion 31 of a wall box 30 and includes a power supply 54 and an electrical load controller 57 to control an electrical load 51. An actuator interface 14, such as a slider switch, is disposed on the load bearing actuator 10. The actuator interface 14 is receptive of first commands relating to basic electrical load control by the controller 57 that are to be transmitted to the controller 57. A communication system, including a terminal 12 that is disposed on the load bearing actuator 10, is coupled to the power supply 54 and the controller 57.

The separate user interface 20 includes a cable 22 and a header 21 to communicate with the terminal 12 whereby the separate user interface 20 receives power and communicates with the controller 57. The separate user interface 20 is removably supportable at the user accessible portion 31 of the wall box 30 and, when the header 21 and the terminal 12 communicate with one another, is configured to identify a type of the load bearing actuator 10 and to receive second commands of a type unique to the identified type of the load bearing actuator 10. These second commands relate to both the basic electrical load control by the controller 57 and to enhanced electrical load control by the controller 57 and are to be transmitted to the controller 57.

The basic electrical load control may refer to various relatively simple controls, such as on/off switching or possibly light dimming. The enhanced electrical load control may include those basic controls and additional functionality. For example, the enhanced electrical load control may include dimming, user interface backlighting, LCD control, touch-sensitive control, user proximity sensing, communication transponder operation, scene control participation, demand-based control and occupancy-based control.

The user accessible portion 31 of the wall box 30 will generally be proximate to a face of the wall box 30 that faces an interior of a space to be occupied by a user, such as a hotel room or an office. The load bearing actuator 10 may be fastened to yoke 11 by any known method, such as a four screw mounting or some other similar method, and may then be positioned within a cavity of the wall box 30 such that the actuator interface 14 faces the space. The load bearing actuator 10 may further include an indicator LED 13 to indicate the present status of the load and the terminal 12. The terminal 12 may be a connector by which power and communications may be provided to the separate user interface 20.

The load bearing actuator 10, being attached to yoke 11, may be fastened by, for example, a two screw mounting into the wall box 30 with line voltage connection wires from a power supply and/or the load 51 being connected to the load bearing actuator 10 via actuator wires 15. Yoke 11 may serve as a heat sink for the load bearing actuator 10 and may be made of metal or some other similar material that provides for efficient heat transfer characteristics.

The separate user interface 20 is electrically coupled to the load bearing actuator 10 through a cable 22, such as a flat ribbon cable or some other similar type of cable, which is terminated with the header 21. The header 21 is insertable into terminal 12 or otherwise able to communicate with the terminal 12. In an exemplary embodiment, the header 21 and the terminal 12 are standardized such that the separate user interface 20 can be mated and, therefore, electrically coupled with any type of load bearing actuator 10 in which case the separate user interface 20 will receive different sets of unique second commands.

In a further exemplary embodiment, the separate user interface 20 may be magnetically mounted onto or otherwise mechanically fastened to either the yoke 11 or the wall box 30 in such a way as to cover the user accessible portion 31 of the wall box 30 and the load bearing actuator 10. As such, the outward appearance of the modular wall box system will be established by the appearance of the separate user interface 20, which can be designed with any number of visual and/or functional options. In addition, the actuator interface 14 may be covered and, therefore, inaccessible to a user with the basic electrical load control being provided by the separate user interface 20.

With reference now to FIG. 2, the load bearing actuator 10 is illustrated as a device that provides for electronic dimming control although it is understood that this is merely exemplary and that other configurations are possible. As shown in FIG. 2, the load bearing actuator 10 may include semiconductor switch 50, which is typically either a triac, which is normally used for resistive and inductive load types, or a field effect transistor (FET), which is normally used for resistive and capacitive loads. Semiconductor switch 50 modulates the line power towards the load 51 provided from source N by, e.g., modulation schemes such as leading edge or trailing edge dimming. Semiconductor switch 50 may be coupled to a heat sink 560, which dissipates the heat generated by the semiconductor switch 50 to the environment. For additional heat dissipation, the heat sink 560 can be coupled to the yoke 11.

Power to the semiconductor switch 50 can be interrupted by the air gap switch 53. Air gap switch 53 contains a contact that can carry the entire load current and may include a plastic lever that is manually operated. With this configuration, a gate drive circuit may be set active by default if no separate user interface 20 is connected to the load bearing actuator 10 and the load 51 is relatively simply operated by operation of the air gap switch 53.

Alternatively, air gap switch 53 functionality can be performed by a relay contact. In this embodiment, the size of the relay can be maintained if the switching of the load 51 is delegated to the semiconductor switch 50 and the relay changes its position only when the semiconductor switch 50 is in the off state. Here, contacts of the relay may have to be rated solely for the load current but not for the load switching aspects. This requires that the air gap switch 53 be properly timed in relation to semiconductor switch 50 such that, when the air gap switch 53 contact is closed, the semiconductor switch 50 is not operated until the contact bouncing of the relay contact has passed. Conversely, before opening the relay contacts, the current through the semiconductor switch 50 has to be fully dissipated, which, in the case of a triac-based dimmer, could mean a delay for up to a half cycle of line power.

Controller 57 arbitrates the signals to the semiconductor switch 50 and the air gap switch 53 and receives signals from the separate user interface 20 as to operating the air gap switch 53 (i.e., in a service mode) and the semiconductor switch 50 (i.e., a dimming control signal). The controller 57 further receives a signal from the actuator interface 14, which may be a slider switch, and which, if closed, signals that the load 51 has to be turned off. If the actuator interface 14 is opened but the separate user interface 20 is connected to the load bearing actuator 10, controller 57 will take the signals from separate user interface 20 into account and operate the semiconductor switch 50 and air gap switch 53 according to the signals of the separate user interface 20. If the separate user interface 20 is not connected, the signals are defaulted to control the load 51 based on the inputs to the actuator interface 14. Controller 57 can optionally operate LED 13 to indicate the on/off state of the load 51.

Controller 57 can be implemented with a low cost microprocessor or microcontroller and may include a processing unit and a memory unit. Executable instructions may be stored on the memory unit, which when executed, cause the processing unit to operate according to a predefined set of routines. Alternatively, controller 57 can be implemented with a small number of discrete components to provide the described lock-out mechanism.

The actuator interface 14 may be disposed at a location which is remote from or otherwise external to the load bearing actuator 10. In this case, the actuator interface 14 acts similarly to the separate user interface 20 but still does not contain customization or extended functionality to allow for, e.g., performance of functions across multiple load bearing actuators 10. That is, a main function of an external actuator interface 14 is to provide for user control of its associated load bearing actuator 10 in a basic fashion at a location which is not strictly limited to the load bearing actuator 10.

The zero crossing detector 55 provides line voltage phase information to the separate user interface 20 by way of a zero crossing signal. Device identification unit 56 indicates a device type of the load bearing actuator 10 to the separate user interface 20 and may include a resistive element, with a resistance value thereof that can be measured by the separate user interface 20. For example, a resistance value of 10 kOhm could indicate a triac-based dimmer for light control applications, a 12 kOhm resistor could be a FET-base dimmer for light control applications, a 15 kOhm resistor could identify a relay controller and a 20 kOhm resistor could identify a variable speed motor controller.

The ability of the separate user interface 20 to identify a type of the load bearing actuator 10 allows the separate user interface 20 to be customizable on-site such that, for example, the separate user interface 20 could be installed onto different load bearing actuators 10 and have the ability modify its own functionality for each. As an example, the separate user interface 20 could be first installed on a light dimming load bearing actuator 10 and then onto an environment controlling load bearing actuator 10. In the first case, the separate user interface 20 is programmed to identify the light dimming function of the load bearing actuator 10 and to thus provide light dimming control options to a user along with other light scene control options. These exemplary "lighting control options" would be a first type of second commands. In the latter case, the separate user interface 20 identifies the environment control function of the load bearing actuator 10 and thus provides environmental controls along with additional associated controls. These exemplary "environmental control options" would be a second type of second commands.

Controller 57 may be implemented as a microcontroller that manages signal protocols between the load bearing actuator 10 and the separate user interface 20. In an exemplary embodiment, the zero crossing signal of the zero crossing detector 55 would be fed directly to controller 57 and the separate user interface 20 would send control commands, such as device control signal commands for setting the dim level to a specific value or to operate the air gap switch 53, to the controller 57. Further, a protocol-based link between the load bearing actuator 10 and the separate user interface 20 also allows for the storing of the device identification unit 56 inside the microcontroller memory.

The load bearing actuator 10 contains the power supply 54. The power supply 54 provides power to all or most of the components inside the load bearing actuator 10 and to the separate user interface 20 by way of the terminal 12, which provides for both the powering of the separate user interface 20 and the transmission of data signals between the load bearing actuator 10 and the separate user interface 20. The data signals may include the zero crossing signal and data reflective of the product identification information of the load bearing actuator 10. The separate user interface 20 transmits the timing signals to operate the semiconductor switch 50 and a signal that is used to operate the air gap switch 53. If the load bearing actuator 10 uses a microprocessor as controller 57, the protocol between the load bearing actuator 10 and the separate user interface 20 may be based on, for example, an IIC or an SPI protocol.

Figure 3:
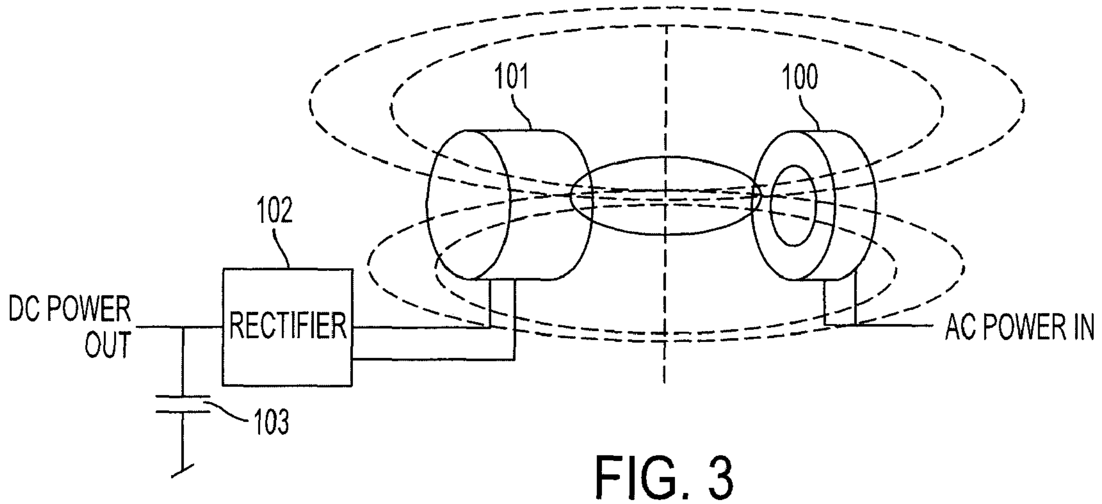
FIG. 3 illustrates inductive power transfer between an actuator device and a separate user interface.

In an embodiment, power to the separate user interface 20 may be transmitted through inductive coupling with communication between the load bearing actuator 10 and the separate user interface 20 occurring through short-haul wireless means, such as IrDA transceivers. As an example, as shown in FIG. 3, the load bearing actuator 10 creates an AC voltage (AC power in) that is fed to the primary winding 100 of a split-core transformer. In the separate user interface 20, the secondary coil 101 of this split core transformer receives the transmitted power and the voltage is fed into a rectifier 102 and a filter capacitor 103. This magnetically coupled power can then be further processed and used in the separate user interface 20. The communication between the load bearing actuator 10 and the separate user interface 20 can be performed by commercially available IrDA transponders.

Figure 4:
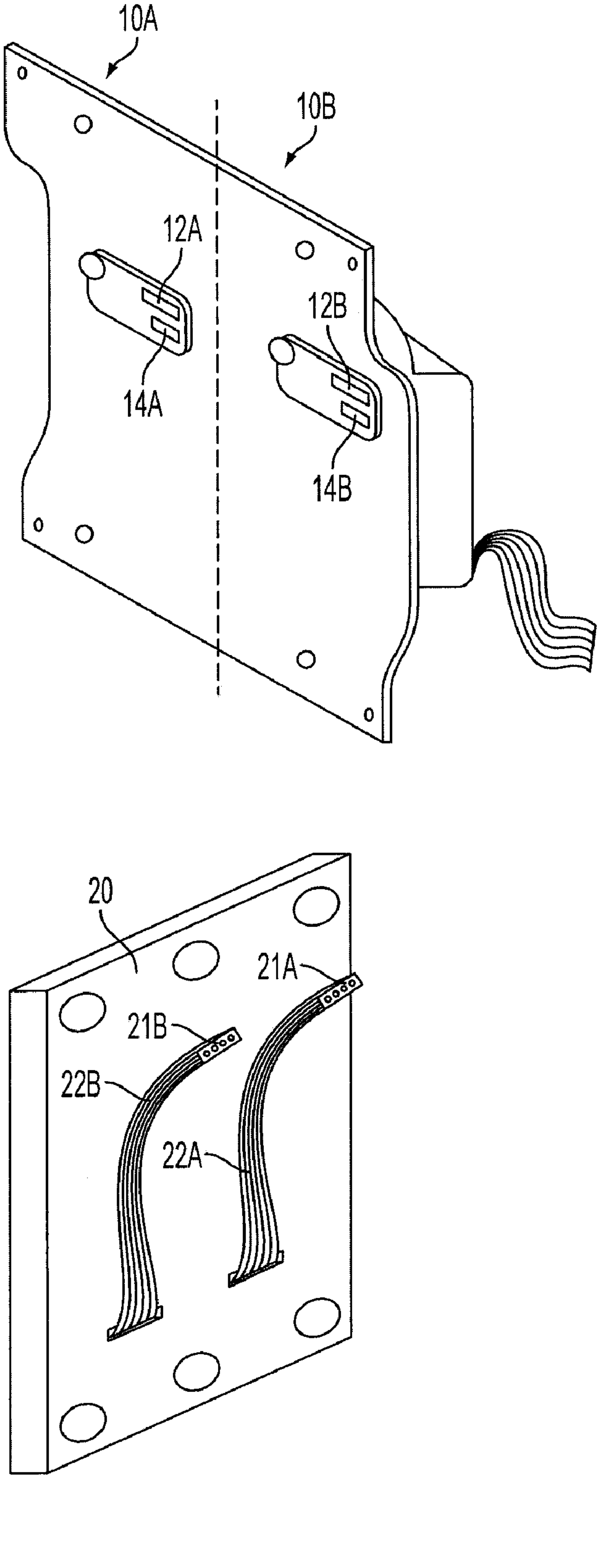
FIG. 4 is a view of a multi-gang modular wall box system assembly.

With reference to FIG. 4, an embodiment of a multi-gang application is shown. Here, two load bearing actuators 10A and 10B are mounted on a single yoke 11 of double-gang size. Each load bearing actuator 10A and 10B is electrically a self-contained product with its own power supply, terminals 12A and 12B and actuator interfaces 14A and 14B, respectively, to control the respective loads for each when no separate user interface 20 is present. In this configuration, the separate user interface 20 features two cables 22A and 22B, each of which is terminated a header 21A and 21B. When the electrical connections between the load bearing actuators 10A and 10B and the headers 21A and 21B are made by way of the terminals 12A and 12B, the separate user interface 20 identifies the respective types of both of the load bearing actuators 10A and 10B and operates each of them.

Figure 5:
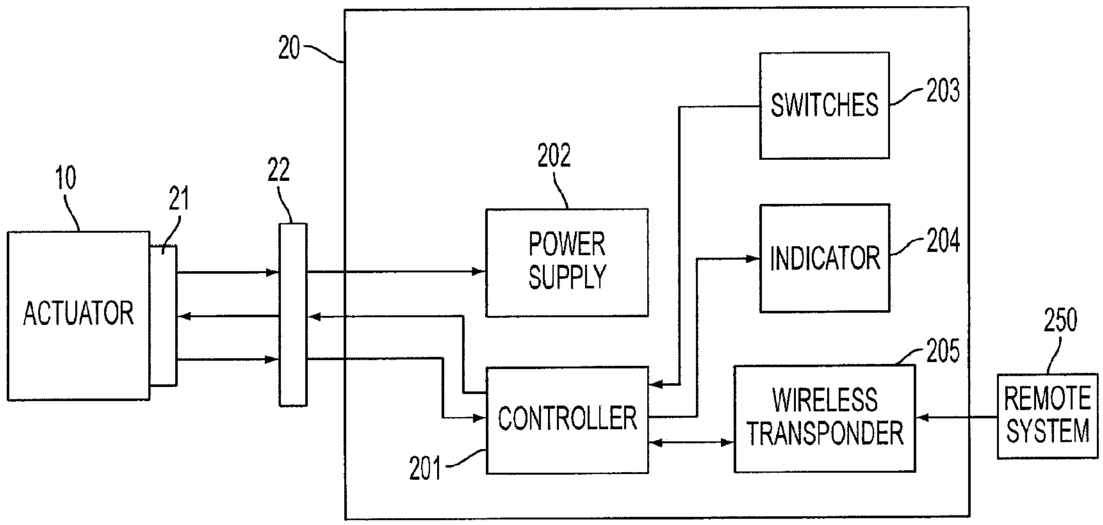
FIG. 5 is a block diagram of a separate user interface for a single gang box device.

FIG. 5. shows a schematic illustration of the separate user interface 20 according to embodiments of the invention. Separate user interface 20 is connected via cable 22 and header 21 to the load bearing actuator 10. Through cable 22, the power supply 202 of the separate user interface 20 is received along with load bearing actuator 10 identification information and zero-crossing signals. By way of software or suitable executable instructions stored in a memory of the controller 201, controller 201 scans for user inputs inputted through a keypad embodied by, e.g., switches 203 or other similar devices such as capacitive touch interfaces, resistive touch screens and sliders. Controller 201 also operates visual indicators 204, which can be LEDs or strings of LEDs, an LCD or an OLED. Controller 201 may further operate a wireless transponder 205 or, in some cases, a networking unit, to communicate with remote system parts 250 of a larger building control application. The load bearing actuator 10 can also be remotely controlled through transponder 205. Additionally, user interactions at the separate user interface 20 can be reported to remote locations. Such events could, for example, include a light scene command that is broadcasted to other members of a larger system.

Figure 6:
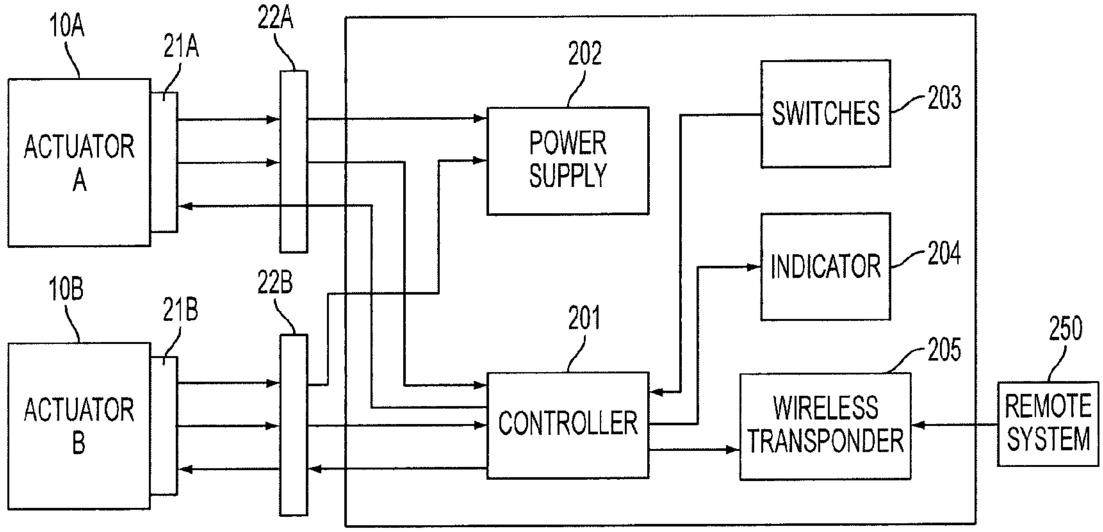
FIG. 6 is a block diagram of a separate user interface for a multi-gang box device.

FIG. 6 shows a schematic illustration of a separate user interface 20 for a multi-gang application in accordance with embodiments of the invention. Here, the power of load bearing actuators 10A and 10B can be provided in parallel to the separate user interface 20. Controller 201 maintains a separate communication link to each load bearing actuator 10A and 10B and thereby identifies the device type of each load bearing actuator 10. For this communication link, a multiplexed bus system can be considered as long as the separate user interface 20 can differentiate between the exact gang position of the load bearing actuators 10A and 10B so that they can be operated in a meaningful way.

As shown in FIG. 6, the shared separate user interface 20 operates in a similar fashion as described above. That is, through cables 22A and 22B, the power supply 202 of the separate user interface 20 is received along with load bearing actuator 10A and 10B identification information and zero-crossing signals. By way of software or suitable executable instructions stored in a memory of the controller 201, controller 201 scans for user inputs inputted through a keypad embodied by, e.g., switches 203 or other similar devices such as capacitive touch interfaces, resistive touch screens and sliders. Controller 201 also operates visual indicators 204, which can be LEDs or strings of LEDs, an LCD or an OLED. Controller 201 may further operate a wireless transponder 205 or, in some cases, a networking unit, to communicate with remote system parts 250 of a larger building control application. The load bearing actuator 10 can also be remotely controlled through transponder 205. Additionally, user interactions at the separate user interface 20 can be reported to remote locations. Such events could, for example, include a light scene command that is broadcasted to other members of a larger system.

Figure 7:
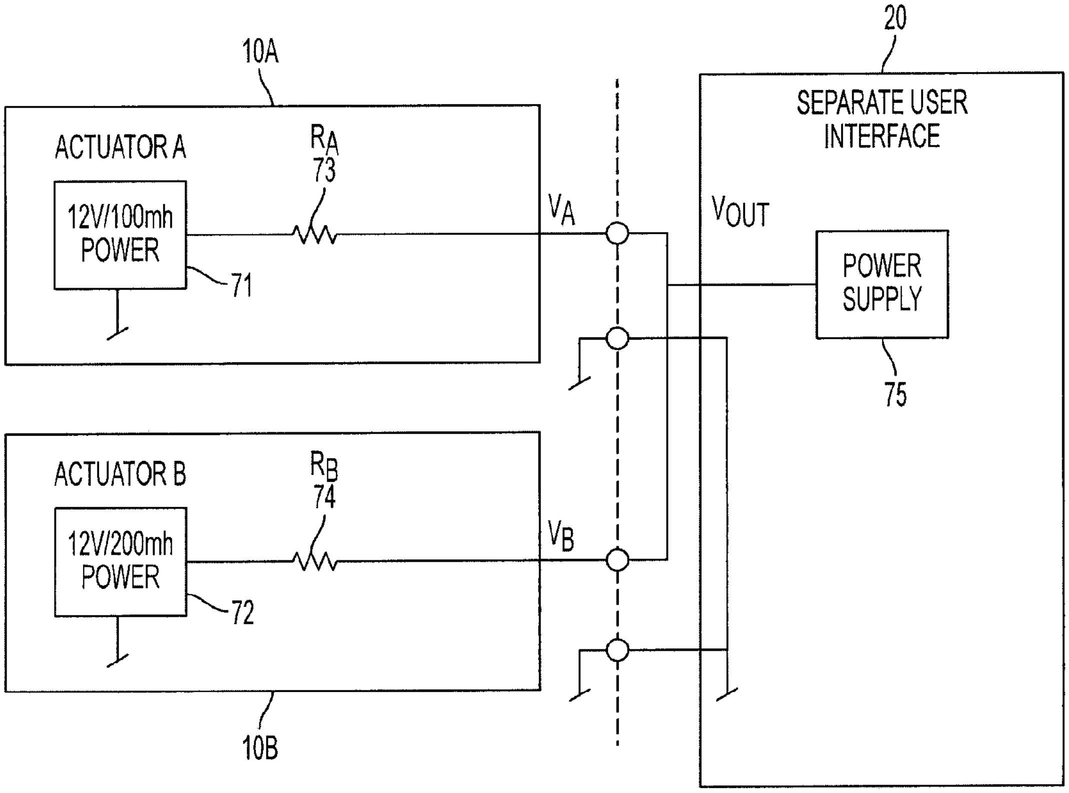
FIG. 7 is a block diagram of power supplies of actuator devices that support paralleling at the separate user interface device.

FIG. 7 shows a schematic power supply diagram for the power supplies of load bearing actuators 10A and 10B. As examples, load bearing actuator 10A contains a power supply 71, such as a switched-mode power supply with a 12 VDC/100 mA capability and load bearing actuator 10B contains a power supply 72, such as a switched-mode power supply with a 12 VDC/200 mA capability. Each power supply 71 and 72 may contain a resistive element $R_A$ 73 and $R_A$ 74, respectively, such as a shunt resistor, which are each configured such that the respective output voltages $V_A$ and $V_B$ reach a specific voltage below, e.g., a nominal 12 VDC output. For example, the output voltage at full nominal current could be defined as 1 VDC below the nominal non-loaded power supply voltage. This is achieved by making resistive element $R_A$ 73 a 10 Ohm resistor and resistive element $R_A$ 74 a 5 Ohm resistor. The power supplies of load bearing actuator 10A and 10B can now be safely paralleled and the total current consumed by the power supply 75 in the separate user interface 20 properly balances the current from each power supply of the load bearing actuators 10A and 10B.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

What is claimed is:

1. A device, comprising:

an actuator, mounted to a wall box, including a power supply, a semi-conductor switch, an electrical load controller and a terminal coupled to the power supply and the controller;

an actuator interface disposed on the actuator to receive first commands relating to basic electrical load control by the controller; and a separate interface, including a header to communicate with the terminal whereby the separate interface receives power and communicates with the controller, the separate interface being supportable at the wall box and, when the header and terminal communicate, configured to identify a type of the semi-conductor switch of the actuator and to receive second commands of a type unique to the identified actuator type and relating to the basic and enhanced electrical load control by the controller.

2. The device according to claim 1, wherein the enhanced electrical load control comprises dimming, user interface backlighting, LCD display, touch control, user proximity sensing, communication transponder operation, scene control participation, demand-based control and occupancy-based control.

3. The device according to claim 1, wherein multiple actuators are ganged and share the separate interface.

* * * * *